United States Patent [19]
Gupta

[11] Patent Number: 5,544,180
[45] Date of Patent: Aug. 6, 1996

[54] ERROR-TOLERANT BYTE SYNCHRONIZATION RECOVERY SCHEME

[75] Inventor: Alok Gupta, Irvine, Calif.

[73] Assignee: QLogic Corporation, Costa Mesa, Calif.

[21] Appl. No.: 439,634

[22] Filed: May 12, 1995

Related U.S. Application Data

[63] Continuation of Ser. No. 894,262, Jun. 8, 1992, abandoned.

[51] Int. Cl.$^6$ .................................................. G06F 11/00
[52] U.S. Cl. ............... 371/47.1; 395/182.1; 395/185.01; 371/5.4; 371/42; 364/285.3; 364/268.9
[58] Field of Search .................................. 371/47.1, 5.4, 371/37.7, 38.1, 39.1, 40.4, 42, 44, 45, 46; 395/182.1, 185.01

[56] References Cited

U.S. PATENT DOCUMENTS

| | | | |
|---|---|---|---|
| 4,016,368 | 4/1977 | Apple, Jr. | 340/146.1 |
| 4,156,867 | 5/1979 | Bench et al. | 340/146.1 |
| 4,225,960 | 9/1980 | Masters | 371/47.1 |
| 4,807,253 | 2/1989 | Hagenauer et al. | 375/57 |
| 4,860,333 | 8/1989 | Bitzinger et al. | 371/68 |
| 4,866,606 | 9/1989 | Kopetz | 364/200 |
| 4,920,535 | 4/1990 | Watanabe et al. | 370/105.1 |
| 5,023,612 | 6/1991 | Liu | 371/47.1 |
| 5,051,998 | 9/1991 | Murai et al. | 371/47.1 |
| 5,088,093 | 2/1992 | Storch et al. | 371/30 |
| 5,117,442 | 5/1992 | Hall | 371/47.1 |
| 5,146,585 | 9/1992 | Smith, III | 371/61 |
| 5,162,954 | 11/1992 | Miller et al. | 360/72.2 |
| 5,204,859 | 4/1993 | Paesler et al. | 370/105.4 |
| 5,220,569 | 6/1993 | Hartness | 371/37.7 |
| 5,237,593 | 8/1993 | Fisher et al. | 371/47.1 |
| 5,243,471 | 9/1993 | Shinn | 360/48 |

OTHER PUBLICATIONS

Blathut, R. Digital Transmission of Information (Dec. 4, 1990).

Primary Examiner—Robert W. Beausoliel, Jr.
Assistant Examiner—Dieu-Minh Le
Attorney, Agent, or Firm—Fish & Richardson P.C.

[57] ABSTRACT

An improved technique for detecting a byte synchronization field encoded on a data storage drive. The technique correctly recovers the byte synchronization even if the byte is corrupted by a single burst error of as many as b bits. One preferred embodiment of an apparatus which implements the improved technique includes a data register for accepting a sequence of data bits from the data storage drive and a synchronization pattern register for storing a selected error-tolerant synchronization field sequence. The contents of the synchronization pattern register are compared with the contents of the data register, and a synchronization detector locates the synchronization field in the sequence of data bits. A number of improved byte synchronization sequences are provided, which yield improved error tolerances when employed in conjunction with the above scheme. A method for determining such improved byte synchronization sequences is also provided.

25 Claims, 8 Drawing Sheets

| BURST LENGTH | PROBABILITY |
|---|---|
| 0 | 0.01645 |
| 1 | 0.36184 |
| 2 | 0.28947 |
| 3 | 0.21546 |
| 4 | 0.09539 |
| 5 | 0.02138 |

FIG. 3

| LENGTH OF CORRECTABLE ERROR BURST | MINIMUM BIT LENGTH OF ERROR-TOLERANT SEQUENCES | NUMBER OF ERROR-TOLERANT SEQUENCES | ERROR-TOLERANT BIT SEQUENCES (IN HEXADECIMAL) |
|---|---|---|---|
| 1 | 7 | 2 | 56, 58 |
| 2 | 8 | 1 | B1 |
| 3 | 10 | 6 | 1B8, 1BC, 1BE, 1E2 2D3, 2D7 |
| 4 | 12 | 1 | DC1 |
| 5 | 14 | 2 | 3581, 3781 |
| 6 | 16 | 54 | 61C8, 61D4, 61D8, 61DC, 61E2, 61E8, 61EC, 61F2, 61F4, 61F8, 61FC, 61FE, 65C8, 65D4, 65D8, 65DC, 65E2, 65E8, 65EC, 65F2, 65F4, 65F8, 65FC, 65FE, 69C8, 69D4, 69D8, 69DC, 69E2, 69E8, 69EC, 69F4, 69F8, 69FC, 69FE, 6DC8, 6DD8, 6DDC, 6DE8, 6DEC, 6DF8, 6DFC, 6DFE, AB01, AB05, AF01, B701, B70D, BB01, BB05, BF01, D701, DB01, DF01 |

FIG. 7

| LENGTH OF THE BURST | MINIMUM LENGTH OF ERROR TOLERANT SEQUENCES | NUMBER OF ERROR TOLERANT SEQUENCES |
|---|---|---|
| 1 | 7 | 2 |
| 2 | 8 | 1 |
| 3 | 10 | 6 |
| 4 | 12 | 1 |
| 5 | 14 | 2 |
| 6 | 16 | 54 |

FIG. 8

ERROR-TOLERANT BYTE SYNCHRONIZATION RECOVERY SCHEME

This is a continuation of application Ser. No. 07/894,262, filed Jun. 8, 1992, now abandoned.

BACKGROUND OF THE INVENTION

1. Field of the Invention

The invention relates generally to data storage techniques employed in conjunction with computing systems, and more specifically to error-tolerant techniques for recovering byte synchronization information from data storage media.

2. Description of the Prior Art

Byte synchronization recovery schemes are often employed in conjunction with data storage units. Many data storage units, such as magnetic disks, store data in concentric circles called tracks. These tracks are divided into blocks called sectors. A sector normally includes a data field, an identification (ID) field, a phase-lock oscillator (PLO) field, and a byte synchronization ("SYNC") field. A sector may further include a cyclic redundancy check (CRC) field, an error correction code (ECC) field, one or more padding (PAD) fields to fill out a sector, and one or more inter-sector gap fields.

Within a sector, synchronization of the data and ID fields is achieved by detecting a particular bit pattern in the synchronization (SYNC) field. The SYNC field enables a determination of the locations of the boundaries between adjacent bytes on the data storage unit. This process may be referred to as "byte synchronization." The SYNC field also enables a determination of the position of a particular byte with respect to the remaining data on the data storage unit. In the case of a magnetic disk, the SYNC field is typically placed immediately after each PLO field and right before the corresponding ID or data field at the time of formatting the disk.

One purpose of the bit pattern in the SYNC field is to provide proper synchronization for the beginning byte of the ID or data fields at the time of a data Read operation. The SYNC field is generally one byte in length, and the field contains a predetermined pattern of bits, referred to as the byte synchronization pattern. The search for the byte synchronization pattern is done over a certain period of time, which is called the "SYNC search window. If a particular byte SYNC pattern is not detected within that window, the information stored in the corresponding sector cannot be retrieved. If there is an error in the SYNC field, either a loss of data or a false detection of synchronization will result. In either case, access to the information stored in the corresponding sector will not be provided, and the data is effectively lost.

Errors in the SYNC field may be characterized as random bit errors. However, due to the fact that the information stored in the SYNC field is processed by a modulation decoder, a random bit error may be transformed into a data burst error affecting a plurality of data bits. The process of byte synchronization occurs after the data bits from the SYNC search window are passed through the modulation decoder. Therefore, data burst errors may prevent synchronization or may cause false synchronization to occur. Commonly-utilized modulation codes have been developed to minimize the length of such data burst errors. For example, the well-known run-length-limited (1,7) and (2,7) codes place inherent limits upon the error propagation properties of the modulation decoder by ensuring that a single-bit error cannot generate a data burst error more than six bits in length.

In the context of a data storage unit, data burst errors affecting the SYNC field are particularly troublesome. For example, the organization of a typical sector on a disk requires that the byte synchronization be recovered two times per sector. The SYNC search window normally begins near the middle of the PLO field. In case of an error in the SYNC field, presently-existing synchronization hardware will simply fail or falsely detect the synchronization. In other words, the existing scheme does not provide any fault tolerance, and thus is very vulnerable to bit errors. No conventional error correction code can be employed to recover from an error in the SYNC field, since any ECC requires bit/byte synchronization.

Hence, a fault-tolerant synchronization detection system is desirable to avoid the disastrous situation of data loss from errors in the SYNC fields, and to achieve high system reliability and performance. The purpose of fault-tolerant synchronization recovery schemes is to enable synchronization even if there is an error in the SYNC field. What is needed is a fault-tolerant synchronization detection scheme which will recover synchronization correctly from short burst errors in a SYNC field. Such a scheme may be employed in conjunction with improved synchronization bit patterns to improve error tolerance.

The present invention provides such a scheme, as well as a method for determining such improved synchronization bit patterns.

SUMMARY OF THE INVENTION

The invention provides an improved technique for detecting the synchronization bit pattern encoded in the SYNC fields on a data storage unit. The fault-tolerant SYNC detection scheme of the present invention provides proper byte synchronization even if the SYNC field is corrupted by a single burst error of as many as b bits. This scheme utilizes one or more specific bit sequences of length L within the SYNC field. These specific bit sequences are referred to as byte synchronization sequences. The minimum length for L is determined by the maximum length b of the error burst for which recovery is desired. The fault-tolerant SYNC detection logic is implemented to provide a SYNC FOUND signal (logical HIGH) if the inputs are all zero (no error), or if the ones in the input are limited to a span of no more than b consecutive bits and the remaining L-b bits are all zero. Otherwise, the logic provides a SYNC NOT FOUND signal (logical LOW).

A plurality of improved byte synchronization sequences are provided, which yield an improved error tolerance when employed in conjunction with the above scheme. Preferred byte synchronization sequences were developed with the assumption that one of the following patterns can appear in the PLO field: (1) all zeros, (2) all ones, (3) repetitive "1000" (binary), or (4) repetitive "001" (binary). This assumption holds true for commonly-available data storage systems. For a data error burst of a given length, the minimum length of the sequences and the number of such sequences may be specified.

If a different set of patterns in the PLO field is expected, then the corresponding byte synchronization sequences would not be the same. An entirely different set of sequences may be obtained with different parameters for a given pattern (or patterns) in the PLO field. These sequences may be determined by exhaustive computer search. A method for determining such improved byte synchronization sequences is also provided.

Further aspects of the present invention will become apparent from the following detailed description when considered in conjunction with the accompanying drawings. It should be understood, however, that the detailed description and the specific examples, while representing the preferred embodiment and several alternative embodiments of the invention, are given by way of illustration only.

BRIEF DESCRIPTION OF THE DRAWINGS

FIG. 3 is a table setting forth the probability of an error burst of a specified length when the modulation decoder of FIG. 2 receives a single bit error.

FIG. 7 is a table setting forth the number and minimum length of error tolerant sequences for specified burst lengths, and the values of such sequences. FIG. 8 is a table that sets forth the number and minimum of error tolerance sequences for specified burst lengths and the number of error tolerant sequences.

Like reference numbers in the various drawings refer to like elements.

DETAILED DESCRIPTION OF THE PREFERRED EMBODIMENTS

The following description is of the best presently contemplated modes of carrying out the invention. This description is made for the purpose of illustrating the general principles of the invention and should not be taken in a limiting sense.

Figure 1:
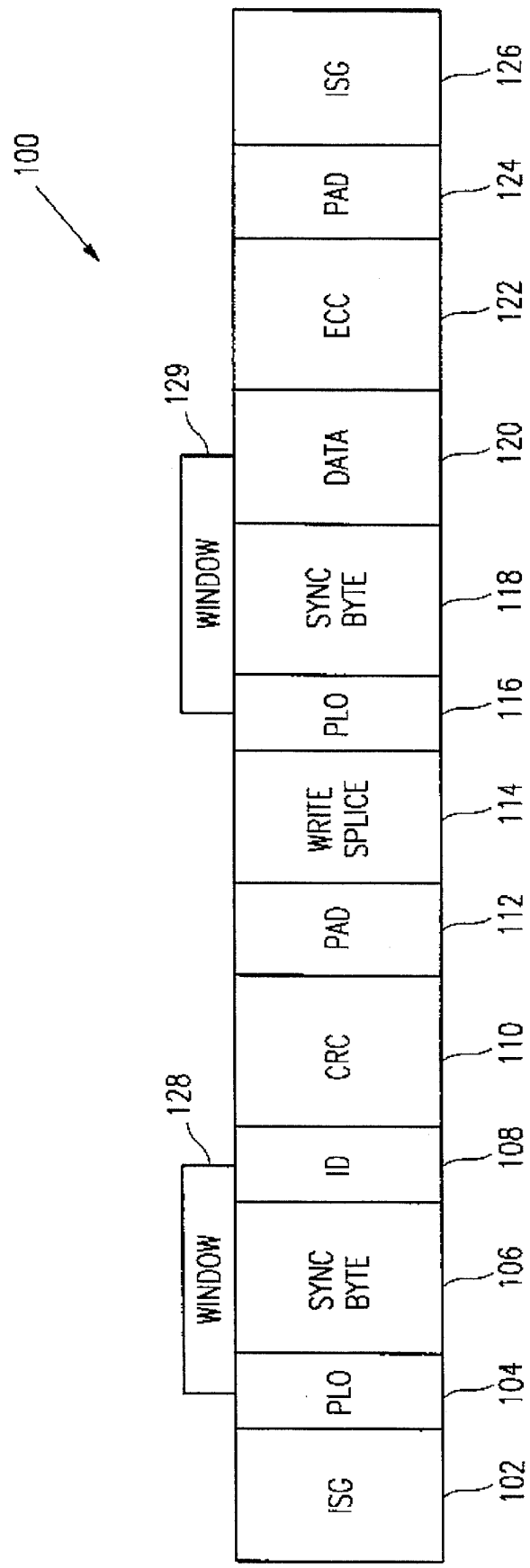
FIG. 1 is a diagrammatical representation of the organization of a typical sector on a magnetic data storage disk.

FIG. 1 is a diagrammatical representation of the organization of a typical sector 100 for a magnetic data storage disk. The sector 100 commences with a "header" comprising a first inter-sector gap (ISG) field 102, followed by a first phase-lock oscillator (PLO) field 104, a first synchronization (SYNC) field 106, an ID field 108, a cyclic redundancy check (CRC) field 110, and a first padding (PAD) field 112. The first PAD field 112 is followed by a Write splice field 114, a second PLO field 116, a second SYNC field 118, a Data field 120, an error correction code (ECC) field 122, and a second PAD field 124. A second ISG field 126 is a part of the next disk sector.

It is important to observe that the byte synchronization needs to be recovered two times per sector, at first SYNC field 106 and second SYNC field 118. The data storage disk input/output (I/O) transducer head searches for the bit pattern stored in the SYNC fields 106, 118, during an interval termed the SYNC search window 128, 129, in known fashion. The length of the SYNC search windows 128, 129 is usually programmable. Typically, for the first SYNC field 106, the first SYNC search window 128 may commence near the middle of the PLO field 104 and terminate near the middle of the ID field 108. For the second SYNC field 118, the second SYNC search window 129 may begin near the middle of PLO field 116 and terminate towards the beginning of the Data field 120.

Figure 2:
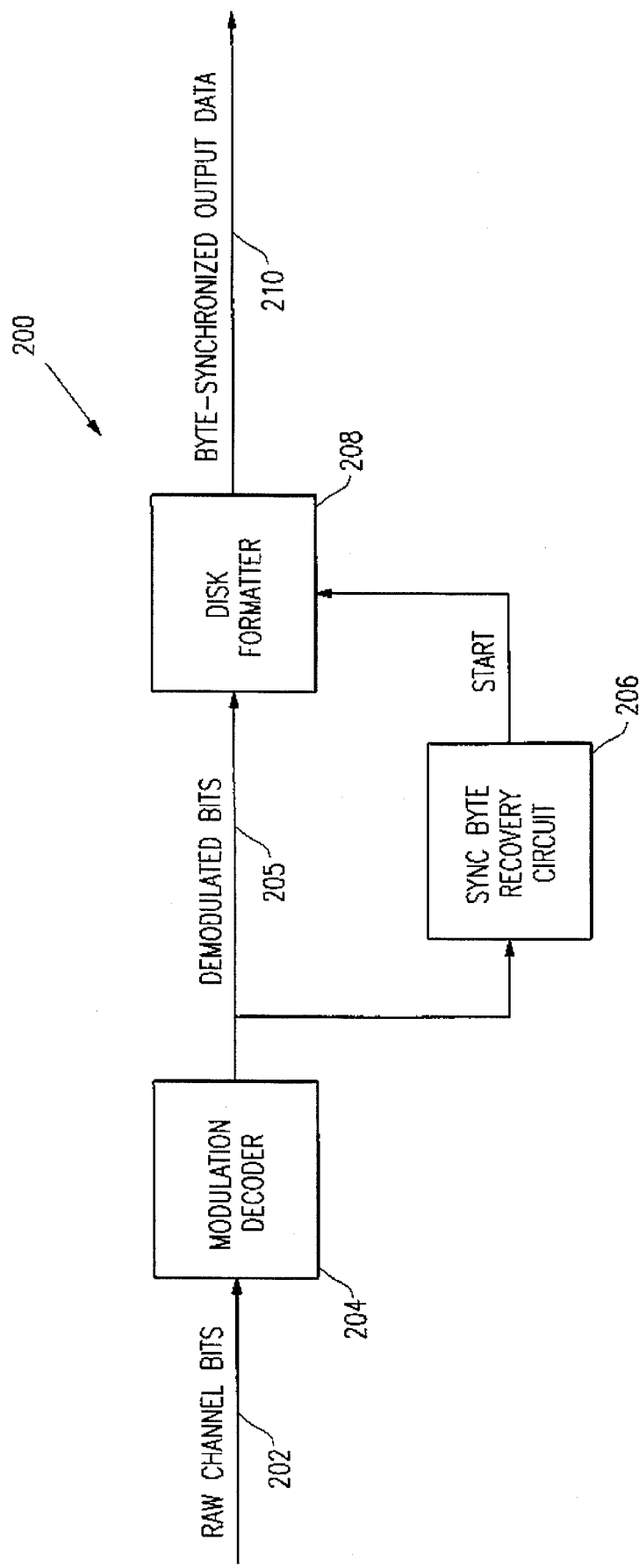
FIG. 2 is a block diagram illustrating a portion of a prior-art hardware configuration designed to implement a byte synchronization scheme.

FIG. 2 is a block diagram illustrating a prior-art hardware configuration 200 for byte synchronization. The raw channel bits 202 received from the magnetic disk I/O transducer and a peak detector are input to a modulation decoder 204. The raw channel bits 202 are generally decoded using a modulation decoding scheme such as the run-length-limited (RLL) (1,7) code or (2,7) code, which are both well-known in the prior art. An important characteristic of most modulation decoding schemes is that a single random bit error at the input to the modulation decoder 204 is transformed by the modulation decoder 204 into a string or burst of errors at the output of the modulation decoder 204.

The modulation decoder 204 demodulates the information stored in the SYNC fields 106, 118 (FIG. 1). The output of the modulation decoder 204 is in the form of a plurality of demodulated bits 205, which are processed by a synchronization recovery circuit 206. Upon recovery of proper synchronization from the demodulated bits 205, the byte SYNC recovery circuit 206 transmits a "start" signal to a disk formatter 208. The disk formatter 208 processes the data received from the modulation decoder 204 to produce byte-synchronized output data.

FIG. 3 is a table setting forth the probability of an error burst of a given length at the output of the modulation decoder 204 (FIG. 2), when the input of the modulation decoder 204 receives a single random bit error. The table is based upon the use of an RLL (2,7) modulation encoding scheme. The table indicates that there is about a 1.6% probability that the error burst length will be 0 bits long, whereas the probability of a 1-bit-long error burst is about 36%. The probability of errors affecting more than 1 bit is considerable. For instance, the probability that a single random bit error will produce a 2 or more bit error burst is about 62%.

Figure 4:
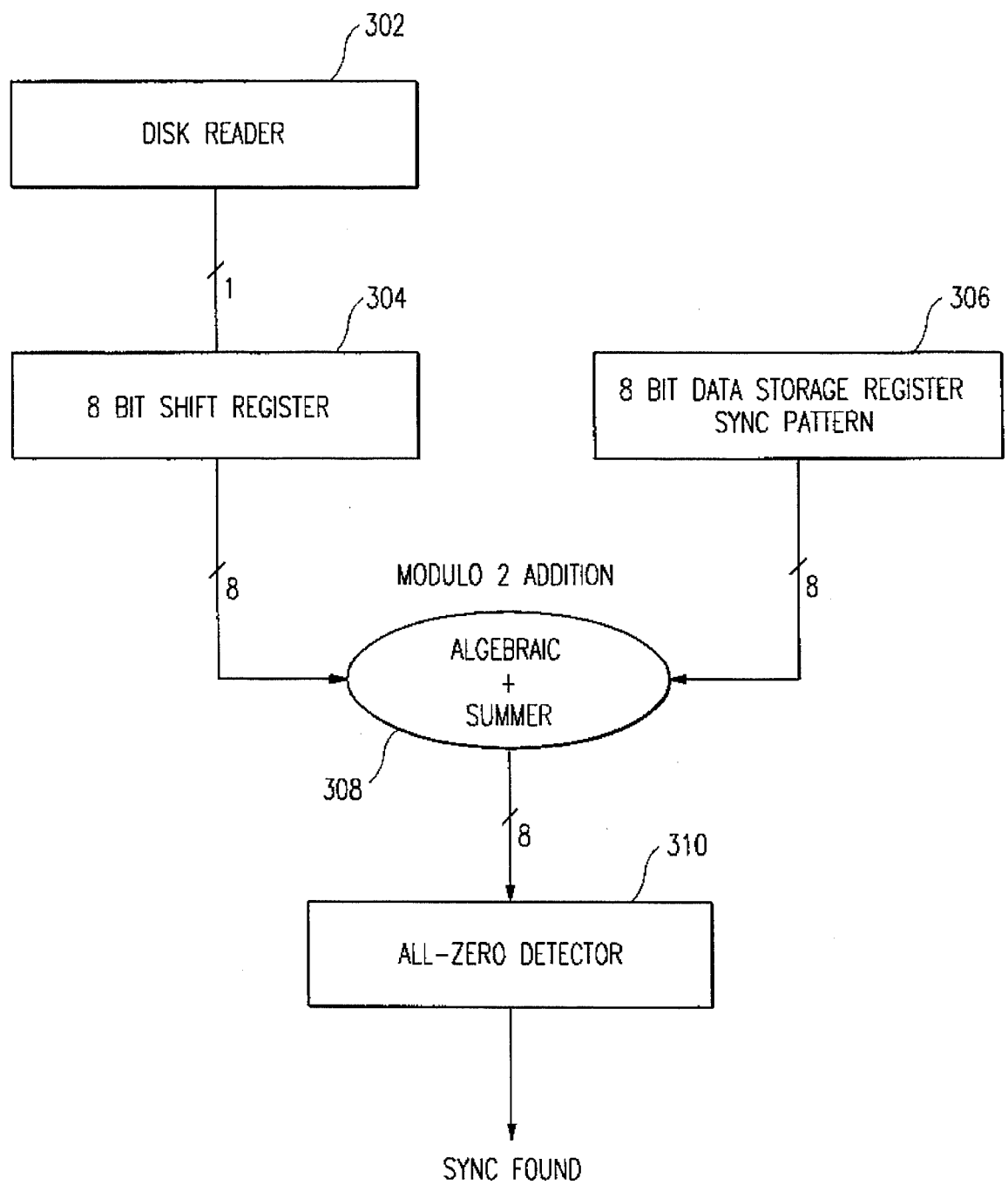
FIG. 4 is a block diagram illustrating a portion of a prior-art hardware configuration for implementing byte synchronization.

FIG. 4 is a block diagram of a prior-art hardware configuration for implementing byte synchronization detection. A magnetic disk reader 302 extracts data signals from a data storage disk in the form of a series of bits. The serial data at the output of the disk reader 302 is stored in an 8-bit shift register 304. An 8-bit data storage register 306 stores an arbitrary SYNC pattern. An algebraic summing circuit 308 (which may comprise Exclusive-OR gates) sums the data from the shift register 304 and the storage register 306 bit-by-bit, such that the first bit of the shift register 304 is added to the first bit of the storage register 306, etc. In this manner, the summing circuit 308 produces an 8-bit output which represents the outcome of a data comparison between the data stored in the shift register 304 and in the storage register 306. If the data in the storage register 306 perfectly matches the data stored in the shift register 304, the output of the summing circuit 304 will be zero for all 8 output bits. An all-zero detector 310 (e.g., an OR gate with 8 inputs) is employed to determine whether the data stored in the shift register 304 matches the data stored in the storage register 306. If all zeros are detected, this signifies that SYNC has been achieved. If all zeros are not detected, the data in the shift register 304 is shifted by one bit, such that one new bit from the disk reader 302 is placed into the shift register 304 at a first end of the 8-bit data word, whereas a bit from the second end of the data word is discarded. The bit comparison process is repeated until SYNC is found, or until the end of the SYNC window is reached.

A disadvantage of the system of FIG. 4 is that, in the case of an error in the SYNC field, the hardware will either (1) falsely detect synchronization at the wrong location within the sector, or (2) fail to detect synchronization at all within the sector. Accordingly, the system does not tolerate random bit errors, nor does the system provide for error correction, within the SYNC fields. Furthermore, no electronic correction circuitry can be employed to recover from error in the SYNC fields because any ECC first requires bit/byte synchronization.

Figure 5:
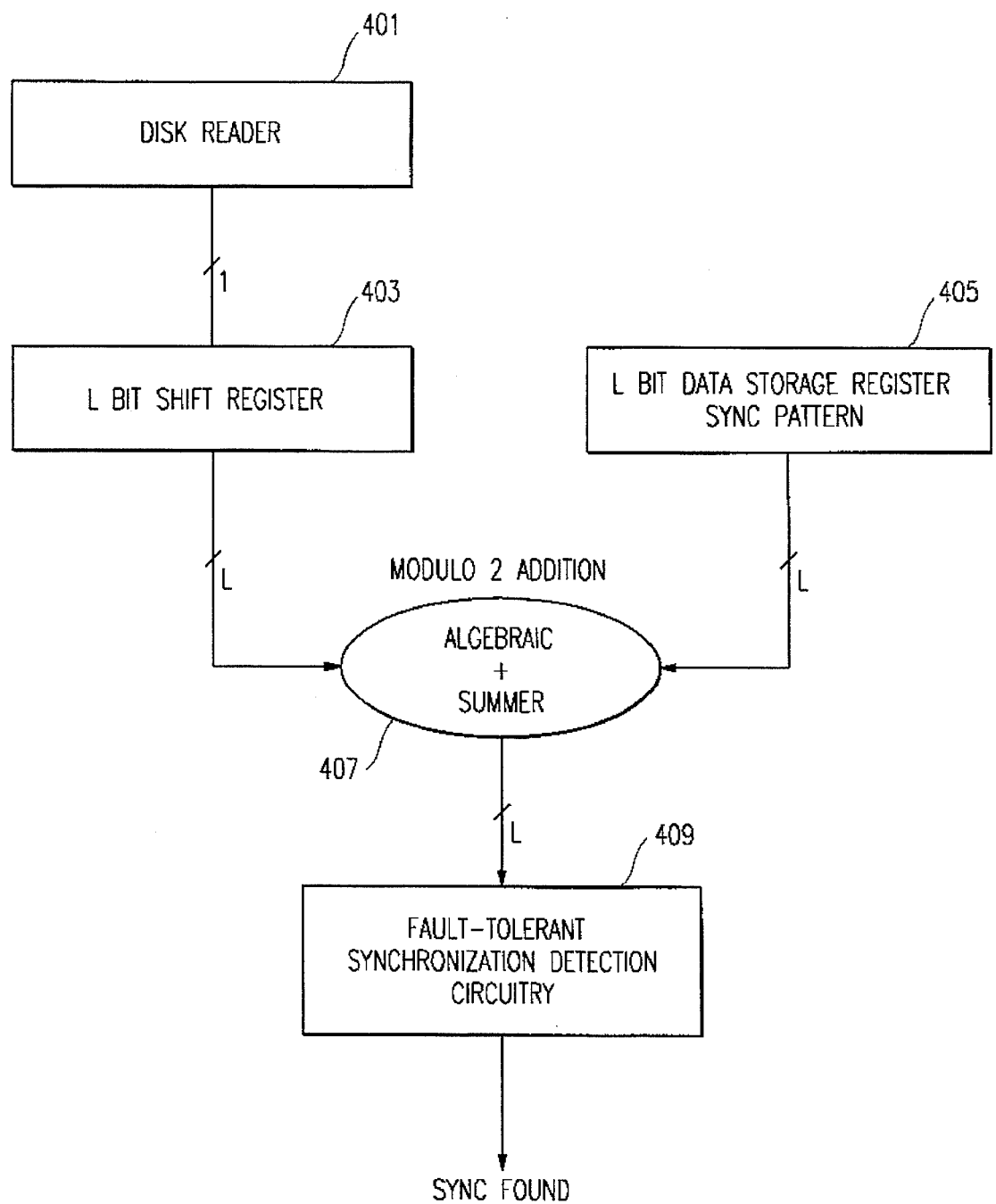
FIG. 5 is a block diagram illustrating a hardware configuration for implementing byte synchronization according to the present invention.

FIG. 5 is a block diagram which illustrates the hardware configuration for a byte synchronization detector according to a preferred embodiment of the present invention. The hardware configuration recovers SYNC correctly, even if a SYNC field is corrupted by a burst error of as many as b bits. The scheme employs a bit sequence of length L for the byte synchronization pattern. The length L may be set to any desired value; however, the length L determines the maximum length of the error burst from which the byte synchronization detection scheme will be able to recover. Particular error-tolerant bit sequences may be determined by conducting an exhaustive computer search, as described hereinafter with reference to FIG. 6, FIG. 7, and

```
--the following computer program:
# include <stdio.h>
main()
{
int field_reg[56],test_reg[76],pat_reg[20],syncpat[70000];
int count,flag,match,max,l,k,i,j,m,sa,temp[20],bl,ij,bin[10],hex[5];
printf ("Enter the length of the sync pattern for search\n");
scanf("%d", &l);
printf("Enter the error burst-length\n");
scanf("%d", &bl);
k = expt (2,l);
for(i = 0; i < k; ++i) syncpat [i] = i;
for(i = 0; i < 16; ++i) field_reg[i] = 0; /*Intializing the sync search reg*/
loop:printf("Choose the bit pattern before the sync field\n");
printf("1. All_zero \n") ;
printf("2. All_one \n") ;
printf("3. Repeatitive 8 \n");
printf("4. Repeatitive 2 4 9 pattern \n");
printf("5. Convert to binary \n");
scanf("%d", &i);
switch(i) {
case 1: for(j = 0; j < 40; ++j) field_reg[16 + j] = 0;
    break;
case 2: for(j = 0; j < 40; ++j) field_reg[16 + j] = 1 ;
    break;
case 3: for (j = 0; j < 10; ++j) {
    field_reg[16 + 4*j] = 1;
    field_reg[16 + 4*j + 1] = field_reg[16 + 4*j + 2] = field_reg[16 + 4*j + 3] = 0;
    }
    break;
case 4: field_reg[16 + 0] = field_reg(16 + 3] = 1;
    field_reg[16 + 1] = field_reg[16 + 2] = 0;
    for(j = 0; j < 3; ++j) {
    field_reg[16 + 12*j + 4 + 0] = field_reg[16 + 12*j + 4 + 1] =
    field_reg[16 + 12*j + 4 + 3] = field_reg[16 + 12*j + 4 + 4] =
    field_reg[16 + 12*j + 4 + 6] = field_reg[16 + 12*j + 4 + 7] =
    field_reg[16 + 12*j + 4 + 9] = field_reg[16 + 12*j + 4 + 10] = 0;
    field_reg[16 + 12*j + 4 + 2] = field_reg[16 + 12*j + 4 + 5] =
    field_reg[16 + 12*j + 4 + 8] = field_reg[16 + 12*j + 4 + 11] = 1;
    }
    break;
case 5: printf("Enter the number\n");
    scanf("%d", &sa);
    convert_to_binary(l, sa, temp);
    for(j = 0; j < l; ++j)
    printf("%d", temp[j]);
    printf("\n");
    exit(0);
}
for(i = 0; i < 56; ++i) test_reg[i] = field_reg[i];
count = 0;
for(i = 0; i < k; ++i)
{
convert_to_binary(l, syncpat[i], pat_reg);
for(j = 0; j < l - (bl - 1); ++j)
{
    for(ij = 0; ij < expt(2, bl); ++ij)
    {
        convert_to_binary(bl, ij, bin);
        put_sync_on_disk(j, test_reg, pat_reg, l, bl, bin);
        for(m = 0; m < 56; ++m) /*Try to find sync at 56 positions*/
        {
        test_reg[56 + l] = pat_reg[i];
```

```
}
sync_found (m, test_reg, pat_reg, 1, b1)
int test_reg[], pat_reg[], m, 1;
{
int i, temp[20], loc, count;
for(i = 0; i < 1; ++i)
temp[i] = ex_or(pat_reg[i], test_reg[m + ij);
count = 0;
for(i = 0; i < 1; ++i)
if(temp[i] == 1) ++count;
if(count > b1) return(-1); /*More than five mismatches*/
if(count == 0 || count == 1) return(1);
if(count > 1)
{
for(i = 0; i < 1; ++i)
if(temp[i] == 1) {
loc = i;
break;
}
}
if(loc + b1 > = 1) return(1);
for(i = loc + bl; i < 1; ++i)
if(temp[i] == 1) return(-1);
return(1);
}
ex_or(a, b)
int a, b;
{
int sum;
if(a > 1 || b > 1) printf("Not valid sequence/n");
sum = a + b;
if(sum == 2) return(0);
else return(sum);
}
expt(k, m)
int k, m;
{
int prod = 1, i;
i = m;
while(i > 0) {
prod = prod*k;
—i;
}
return(prod);
}
convert_to_binary(m, n, binary)
int m, n, binary[];
{
    int i, temp[20], number, k;
    number = n;
    k = 0;
    for(i = 0; i < m; ++i)
    temp[i] = 0;
    do
    match = sync_found(m, test_reg, pat_reg, 1, b1);
    if(match == 1) gotocomputer_loop; /*That vector is to be rejected*/
        }
}
}
syncpat[count] = syncpat[i];/*Store the vector with error tolerant property*/
++count;
outer_loop: ;
}
printf("Number of patterns is %d\n", count);
printf("Do you want to see the pattern\n");
scanf("%d", &sa);
if(sa == 1) {
for(j = 0; j < count; ++j) {
convert_to_binary(1, syncpat[j], pat_reg);
convert_print_in_hex(1, pat_reg, hex);
printf("\n");
}
}
printf("Do you want to perform search for another preamble for these pattern, 1 or")
scanf("%d", &sa);
if(sa ==1) {
k = count;
goto loop;
}
```

```
}
convert_print_in_hex(1, pat_reg, hex)
int 1, pat_reg[], hex[];
{
int i, n, temp[20];
n = ¼;
if((1 – 4*n) i – 0) ++n;
for(i = 0; i < 1; ++i) temp[i] = pat_reg[1 – 1 – i];
for(i = 0; i < n; ++i)
hex[i] = temp[4*i] + 2*temp[4*i + 1] + 4*temp[4*i + 2] + 8*temp[4*i + 3];
printf(" ");
for(i = 0; i < n; ++i) {
if(hex[n – 1 – i] == 10) printf("A");
else if(hex[n – 1 – i] == 11) printf("B");
else if(hex[n – 1 – i] == 12) printf("C");
else if(hex[n – 1 – i] == 13) printf("D");
else if(hex[n – 1 – i] == 14) printf("E");
else if(hex[n – 1 – i] == 15) printf("F");
else printf ("%d", hex[n – 1 – i]);
}
}
put_sync_on_disk(n, test_reg, pat_reg, 1, b1, bin)
int test_reg[], pat_reg[], 1, n, bin[], b1;
{
int i, temp[20], j, count;
count = 0;
while(count < n)
    {
    test_reg[56 + count] = pat_reg[count];
    ++count;
    }
        for(i = count; i < count + b1; ++i)
        test_reg[56 + i] = ex_or(pat_reg[i], bin[i – count]);
        for(i = count + b1; i < 1; ++i)
        {
        temp[k] = number – (number/2)*2;
            number = number/2;
        }
        while(number 1 = 0);
        for(i = 0; i < m; ++i)
        binary[i] = mtemp[m – 1 – i];
}
```

In operation, the serial data from a disk reader 401 is placed into a data shift register 403 having a length of L bits. A pattern storage register 405 of length L bits is used to store the desired byte SYNC pattern. An algebraic summing circuit 407 compares the serial data to the desired SYNC pattern by adding respective bits of the data shift register 403 to corresponding bits of the pattern storage register 405, bit-by-bit. That is, the first bit of the pattern storage register 405 is added to the first bit of the data shift register 403, the second bit of the pattern storage register 405 is added to the second bit of the data shift register 403, etc. The addition is performed in modulo-2 (binary), and may be performed by Exclusive-OR gates. If corresponding bit positions for the two numbers being added are the same, the output signal for that position will be a logical "0". If the corresponding bit positions for the two numbers being added differ, the output signal for that position will be a logical "1".

The output of the summing circuit 407 is processed by a fault-tolerant synchronization detection logic circuit 409. The detection logic 409 is configured to provide an output of "1" if all zeros are produced by the summing circuit 407, signifying that there was no random bit error and that SYNC has been found. SYNC will also be indicated as found, and an output of "1" provided by the detection logic 409, even if some bits differ between the two numbers being compared, under the following conditions: (1) the number of "1" bits must be limited to a span of no more than b consecutive bits in a SYNC pattern of length L, and (2) the remaining bits must be zero (minimum number is L-b). In all other cases, the detection logic 409 will produce an output of "0", signifying that SYNC has not been found.

If SYNC is not found, the data in the data shift register 403 is shifted by one bit, with a new bit being introduced from the disk reader 401, and the comparison process is repeated.

Figure 6:
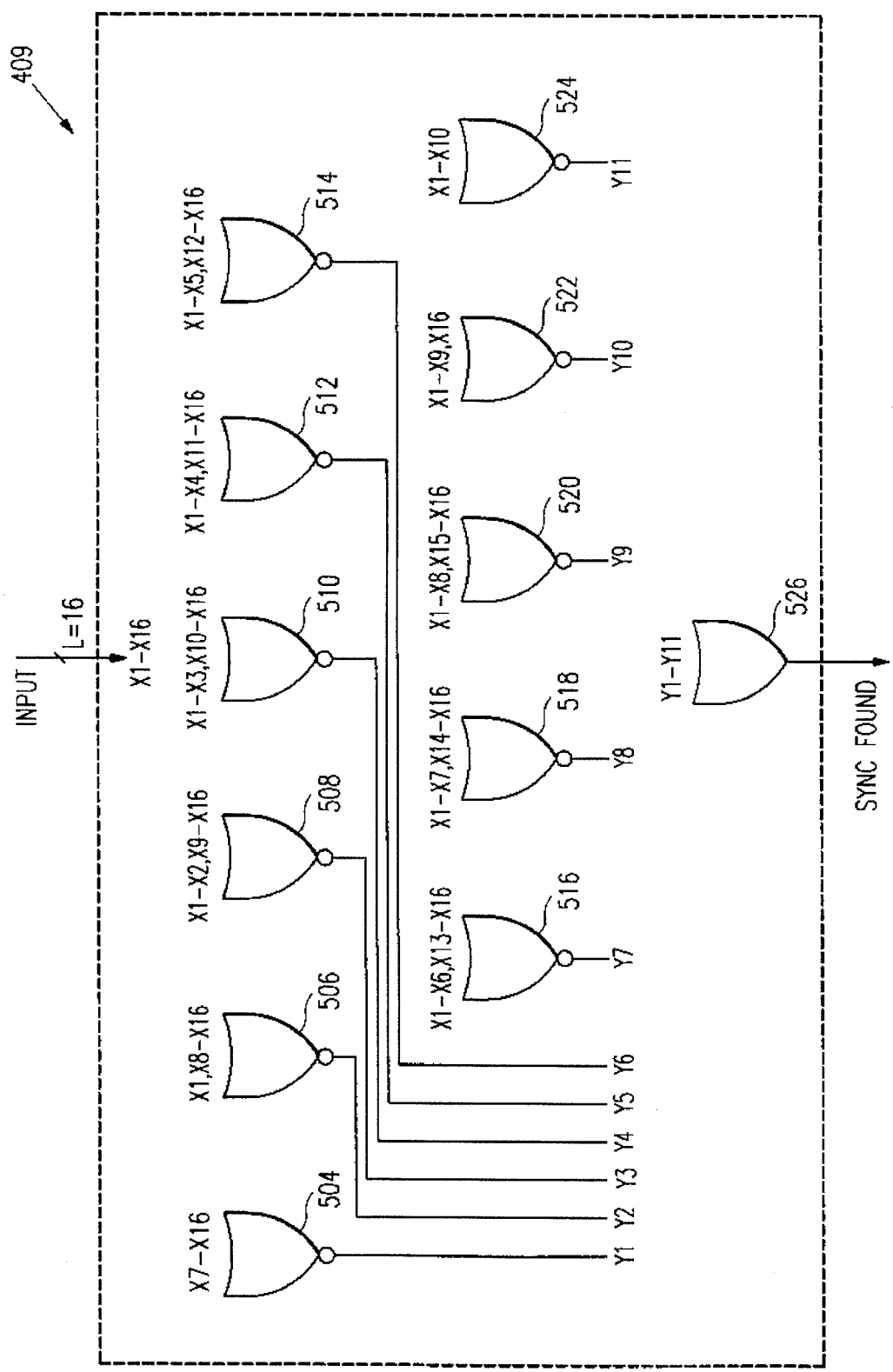
FIG. 6 is a partial schematic and block diagram illustrating optimized logic for a preferred embodiment of the present invention.

FIG. 6 illustrates an optimized circuit for the fault-tolerant synchronization detection logic circuit 409. The circuit 409 is optimized for L=16 and b=6. The gates 504–524 are all 10-input NOR gates or logical equivalents. The OR gate 526 is an 11-input OR gate or a logical equivalent.

The inputs of the NOR gates 504–524 are connected to the 16 algebraic summing circuit 407 (FIG. 5) output bits as follows:

| GATE | BITS |
| --- | --- |
| 504 | 7–16 |
| 506 | 1, 8–16 |
| 508 | 1–2, 9–16 |
| 510 | 1–3, 10–16 |
| 512 | 1–4, 11–16 |
| 514 | 1–5, 12–16 |
| 516 | 1–6, 13–16 |
| 518 | 1–7, 14–16 |
| 520 | 1–8, 15–16 |
| 522 | 1–9, 16 |
| 524 | 1–10 |

The output of each NOR gate 504–524 is fed to a respective input of the 11-input OR gate 526. A "1" (logical HIGH) at the output of the OR gate 526 signifies that SYNC has been detected, whereas a "0" (logical LOW) at the output signifies that SYNC has not been found.

Examining the operation of the fault-tolerant synchronization detection circuitry 409, it is apparent that the circuit in effect "counts" the number of ones output by the algebraic summing circuit 407. That is, a logical HIGH will be produced at the output of the OR gate 526 if all 16 output bits of the algebraic summing circuit 407 are zero. Furthermore, a logical HIGH will be produced if no more than 6 consecutive bits of the output of the algebraic summing circuit 407 have a value of one, with the remaining summing circuit 407 output bits being zeros. In this manner, SYNC detection is provided even if a random bit error corrupts as many as 6 consecutive bits at the output of the modulation decoder 204 (FIG. 2).

Although a particular algebraic summing circuit is shown, any circuit that can determine the number of zeros and the number of ones in a span of b bits output by the algebraic summing circuit 407 will accomplish the same function.

An improved byte synchronization sequence for the SYNC field must be employed in conjunction with the hardware configurations of FIGS. 5 and 6 to yield such an improved error tolerance. In the present example, the SYNC field is two bytes in length, as is the length of the error-tolerant byte synchronization sequence. In determining appropriate error-tolerant byte synchronization sequences, it is important to note that the PLO field patterns may influence the sequence because respective PLO fields 104, 116 (FIG. 1) are adjacent to corresponding SYNC fields 106, 118 (FIG. 1) and within the SYNC search windows 128, 129. That is, any selected error-tolerant byte synchronization sequence must not be mistaken for an allowed PLO field 104, 116 bit sequence. The preferred improved error-tolerant sequences were developed by observing that certain types of bit patterns generally recur in the PLO fields 104, 116. In particular, common bit patterns for the PLO fields 104, 116 are (1) all zeros, (2) all ones, (3) repetitive "1000" (binary), and (4) repetitive "001" (binary).

The error-tolerant byte synchronization sequences of the present invention were determined through an exhaustive search process. The search may be conducted with the aid of a computer algorithm, such as the algorithm set forth in the computer program listing of the above computer program. For particular bit patterns in the PLO fields 104, 116, the goal of the search process is to locate error-tolerant byte synchronization sequences of length L for SYNC recovery from an error burst of no more than length b within the SYNC field. There are $2^L$ sequences of length L. There are $(L-b+1) \times 2^b$ possible error events with a burst length of b ($2^b$ error patterns at (L−b+1) locations). The algorithm tests each sequence one-by-one for its error tolerance to each such possible error event. The preferred process may be summarized as follows:

For a particular PLO pattern $P_o$:
(1) Generate a test byte synchronization sequence $N_i$ of length L;
(2) For $N_i$, generate a possible error pattern $E_j$ of length b to create an error data sequence $D_{ijk}$ (simulating the occurrence of error pattern $E_j$ at a particular location K within $N_i$);

(3) Concatenate $P_o$ and $D_{ijk}$ to create $D_{ijk}'$ (simulating the start of the SYNC (3) search window within the PLO field; each selected error-tolerant byte synchronization sequence must be tested against the bit stream that would be read from the PLO fields 104, 116 to ensure that the selected sequence would not be mistaken for an allowed PLO field 104, 116 bit sequence).
(4) Exclusive-OR (XOR) sum $N_i$ and $D_{ijk}'$ (simulating the operation of the algebraic summing circuit 407 in the computer program);
(5) Test the XOR sum through the fault-tolerant SYNC detection logic (simulated in the computer program). If the comparison to $D_{ijk}'$ results in false detection of SYNC or SYNC not found, then (a) the sequence $N_i$ is discarded, otherwise (b) shift $D_{ijk}'$ one bit and repeat step (4);
(6) Repeat steps (2)–(5) for a next error pattern $E_j$;
(7) If the $N_i$ sequence passes steps (2)–(6) for all $E_j$, then save that sequence as one of a series of sequences S, since it correctly recovers SYNC from all possible error conditions with PLO pattern $P_o$;
(8) Repeat steps (1)–(7) for a next sequence $N_i$.

The above steps find a set S of all possible error-tolerant byte synchronization sequences that can be used with a particular PLO pattern $P_o$ using the circuits shown in FIGS. 5 and 6. To ensure that the selected sequences in set S can be used with other PLO sequences, steps (2)–(8) of the process described above are repeated using a new PLO pattern $P_o'$, and where $N_i$ is selected from the set S. A new set, S', is thus generated.

To find the minimum length L of an error-tolerant byte synchronization sequence for SYNC recovery from an error burst of as much as length b, the above algorithm must be executed for different trial lengths of L, until one or more sequences are found which qualify under all possible error conditions, including different bit patterns in selected PLO fields. It has been found that the minimum value for L is 7 bits, which permits recovery from 1 bit error bursts.

The resulting set S or S' contains all error-tolerant byte synchronization sequences that can be used with the circuits shown in FIGS. 5 and 6 for any of the tested PLO field bit patterns. For any desired error burst length b, one of the error-tolerant byte synchronization sequences of corresponding length L is selected from S or S' to be used as the value for the SYNC fields 106, 118.

The process set forth above could be implemented in a number of ways to achieve an equivalent result. For example, instead of testing each $N_i$ against a selected PLO pattern $P_o$, all possible members of set S could be generated without regard to any PLO pattern. Thereafter, the members of set S could be tested against a sequence of PLO patterns, thus generating successively smaller sets S' of valid test byte synchronization sequences. Moreover, once one member of the set S' with a particular length L is found, further searching can be terminated. p An error-tolerant SYNC field bit sequence may be based upon expected or predicted PLO field 104, 116 bit patterns. For example, one or more of the following patterns are typical of the patterns that appear in PLO fields: (1) all zeros, (2) all ones, (3) repetitive "1000" (binary), and (4) repetitive "001" (binary). Based upon these particular expected PLO field patterns, the minimum length L of S' error-tolerant byte synchronization sequences and the number of such sequences were found by computer search, as described above. Examples of error-tolerant byte synchronization sequences are shown in FIG. 7 (the length shown in the second column takes into account significant leading zeros).

Referring again to FIG. 7, the ability to recover from an error burst length of 1 bit corresponds to an error-tolerant sequence having a minimum length of 7 bits. The number of such sequences is 2. To recover from an error burst length of as much as 6 bits, the minimum length of each error-tolerant sequence is 16 bits. The number of such sequences is 54. These latter sequences are particularly practical, since the commonly-used run-length-limited (1,7) and (2,7) codes limit error propagation by ensuring that a single-bit error cannot generate a data burst error more than 6 bits in length.

In summary, the present invention provides a fault-tolerant synchronization detection system that can avoid the disastrous situation of data loss from errors in SYNC fields, and thereby achieves high system reliability and performance. The inventive fault-tolerant synchronization detection scheme recovers synchronization correctly from burst errors in a SYNC field by using improved byte synchronization sequences. The present invention also provides a method for determining such improved byte synchronization sequences.

A number of embodiments of the present invention have been described. Nevertheless, it will be understood that various modifications may be made without departing from the spirit and scope of the invention. For example, although the illustrated embodiment has been described in the context of magnetic disk drive data storage devices, the invention could easily be adapted to other data storage devices, such as optically-based disk drives. Further, although particular registers and comparator circuitry is shown, the invention encompasses other memory elements and comparison circuitry configured to provide the same functions. Accordingly, it is to be understood that the invention is not to be limited by the specific illustrated embodiment, but only by the scope of the appended claims.

I claim:

1. A system for detecting a selected error-tolerant synchronization field bit sequence encoded in a sequence of data bits on a data storage means, the system including:
   (1) data register means, coupled to the data storage means and having a length of L bits, for serially accepting the sequence of data bits from the data storage means;
   (2) synchronization pattern register means, having a length of L bits, for storing the selected error-tolerant synchronization field bit sequence;
   (3) comparison means, coupled to the data register means and the synchronization pattern register means, for comparing the contents of the synchronization pattern register means with the contents of the data register means; and
   (4) synchronization detection means, coupled to the comparison means and responsive thereto, for locating the error-tolerant synchronization field bit sequence encoded in the sequence of data bits, wherein the synchronization detection means provides an indication of synchronization when an output of the comparison means indicates that no more than b consecutive bits of the synchronization pattern register means do not match corresponding bits of the data register means, but a remainder of the L bits of the synchronization pattern register means do match corresponding bits of the data register means, the remainder of the L bits including all of the L bits except the b consecutive bits, and wherein b is an integer value greater than one.

2. A system for detecting a selected error-tolerant synchronization field bit sequence encoded on a data storage unit, the system including:
   (1) a data storage unit;
   (2) reading means, coupled to the data storage unit, for reading data bits stored on the data storage unit, the data bits including at least one field consisting of a selected error-tolerant synchronization field bit sequence of length L;
   (3) data register means, coupled to the reading means, having a length of L bits, for serially accepting a sequence of data bits from the reading means;
   (4) synchronization pattern register means, having a length of L bits, for storing the selected error-tolerant synchronization field bit sequence;
   (5) comparison means, coupled to the data register means and the synchronization pattern register means, for comparing the contents of the synchronization pattern register means with the contents of the data register means; and
   (6) synchronization detection means, coupled to the comparison means and responsive thereto, for locating the selected error-tolerant synchronization field bit sequence in the sequence of data bits provided by the reading means, wherein the synchronization detection means provides an indication of synchronization when an output of the comparison means indicates that no more than b consecutive bits of the synchronization pattern register means do not match corresponding bits of the data register means, but a remainder of the L bits of the synchronization pattern register means do match corresponding bits of the data register means, the remainder of the L bits including all of the L bits except the b consecutive bits, and wherein b is an integer value greater than one.

3. A system for detecting a selected error-tolerant synchronization field bit sequence as set forth in claims 1 or 2, wherein the synchronization detection means includes a plurality of NOR gates.

4. A system for detecting a selected error-tolerant synchronization field bit sequence as set forth in claims 1 or 2, wherein the comparison means includes a modulo-two algebraic summing circuit.

5. A system for detecting a selected error-tolerant synchronization field bit sequence as set forth in claims 1 or 2, wherein L is equal to 16 bits.

6. A system for detecting a selected error-tolerant synchronization field bit sequence as set forth in claim 5, wherein b is less than 7 bits.

7. A system for detecting a selected error-tolerant synchronization field bit sequence as set forth in claims 1 or 2, wherein the selected error-tolerant byte synchronization field bit sequence is determined with respect to at least one expected bit pattern in a field bit sequence preceding the error-tolerant synchronization field bit sequence.

8. A system for detecting a selected error-tolerant synchronization field bit sequence as set forth in claims 1 or 2, wherein L is equal to 8 bits, b is equal to 2 bits, and the selected error-tolerant synchronization field bit sequence is hexadecimal B1.

9. A system for detecting a selected error-tolerant synchronization field bit sequence as set forth in claims 1 or 2, wherein L is equal to 10 bits, b is equal to 3 bits, and the selected error-tolerant synchronization field bit sequence is a hexadecimal 1B8, 1BC, 1BE, 1E2, 2D3 or 2D7.

10. A system for detecting a selected error-tolerant synchronization field bit sequence as set forth in claims 1 or 2, wherein L is equal to 12 bits, b is equal to 4 bits, and the selected error-tolerant synchronization field bit sequence is hexadecimal DC1.

11. A system for detecting a selected error-tolerant synchronization field bit sequence as set forth in claims 1 or 2, wherein L is equal to 14 bits, b is equal to 5 bits, and the selected error-tolerant synchronization field bit sequence is a hexadecimal 3581 or 3781.

12. A system for detecting a selected error-tolerant synchronization field bit sequence as set forth in claims 1 or 2, wherein L is equal to 16 bits, b is equal to 6 bits, and the selected error-tolerant synchronization field bit sequence is a hexadecimal 61C8, 61D4, 61D8, 61DC, 61E2, 61E8, 61EC, 61F2, 61F4, 61F8, 61FC, 61FE, 65C8, 65D4, 65D8, 65DC, 65E2, 65E8, 65EC, 65F2, 65F4, 65F8, 65FC, 65FE, 69C8, 69D4, 69D8, 69DC, 69E2, 69E8, 69EC, 69F4, 69F8, 69FC, 69FE, 6DC8, 6DD8, 6DDC, 6DE8, 6DEC, 6DF8, 6DFC, 6DFE, AB01, AB05, AF01, B701, B70D, BB01, BB05, BF01, D701, DB01, or DF01.

13. A system for detecting a selected error-tolerant synchronization field bit sequence encoded on a data storage unit, the system including:

(1) a data storage unit;

(2) reading means, coupled to the data storage unit, for reading data bits stored on the data storage unit, the data bits including at least one field consisting of a selected error-tolerant synchronization field bit sequence of length L;

(3) data register means, coupled to the reading means, having a length of L bits, for serially accepting a sequence of data bits from the reading means;

(4) synchronization pattern register means, having a length of L bits, for storing the selected error-tolerant synchronization field bit sequence;

(5) comparison means, coupled to the data register means and the synchronization pattern register means, for comparing the contents of the synchronization pattern register means with the contents of the data register means; and (6) synchronization detection means, coupled to the comparison means and responsive thereto, for locating the selected error-tolerant synchronization field bit sequence in the sequence of data bits provided by the reading means, wherein the synchronization detection means provides an indication of synchronization when an output of the comparison means indicates that no more than b consecutive bits of the synchronization pattern register means do not match corresponding bits of the data register means, but a remainder of the L bits of the synchronization pattern register means do match corresponding bits of the data register means, the remainder of the L bits including all of the L bits except the b consecutive bits, and wherein L is equal to 7 bits, b is equal to 1 bit, and the selected error-tolerant synchronization field bit sequence is a hexadecimal 56 or 58.

14. An error-tolerant synchronization field bit sequence which is a hexadecimal 56, 58, B1, 1B8, 1BC, 1BE, 1E2, 2D3, 2D7, DC1, 3581, 3781, 61C8, 61 D4, 61D8, 61DC, 61E2, 61E8, 61EC, 61F2, 61F4, 61F8, 61FC, 61FE, 65C8, 65D4, 65D8, 65DC, 65E2, 65E8, 65EC, 65F2, 65F4, 65F8, 65FC, 65FE, 69C8, 69 D4, 69D8, 69DC, 69E2, 69E8, 69EC, 69F4, 69F8, 69FC, 69FE, 6DC8, 6DD8, 6DDC, 6DES, 6DEC, 6DF 8, 6DFC, 6DFE, AB01, AB05, AF01, B701, B70D, BB01, BB05, BF01, D701, DB01, or DF 01, in a system for detecting the synchronization field bit sequence, the system including a data storage unit having at least one track for storing data each track including at least one sector, each sector including at least one synchronization field for storing the synchronization field bit sequence, wherein the synchronization field bit sequence allows the system to correctly detect the error-tolerant synchronization field bit sequence encoded as a sequence of data bits on the data storage unit which are corrupted by an error burst having a length of as many as b bits by comparing the contents of the synchronization field to the sequence of data bits and by disregarding up to b bits of the error-tolerant synchronization field bit sequence, and wherein b is an integer value greater than one.

15. A method of determining in a computer selected error-tolerant synchronization field bit sequences for inclusion in a sequence of data bits on a data storage unit, comprising the steps of:

(1) selecting a bit pattern $P_o$, expected to precede the selected error-tolerant synchronization field bit sequence in said sequence of data bits on a data storage device;

(2) generating a comparison result by comparing each of a generated test byte synchronization sequence $N_i$ of length L with a generated possible error data sequence $D_{ijk}$ that includes $P_o$;

(3) testing the comparison result through synchronization detection logic, and if the comparison result indicates that more than b bits of the generated test byte synchronization sequence $N_i$ differ b from corresponding bits of generated possible error data sequence, where b is an integer value greater than one, then:

(a) discarding the sequence $N_i$; otherwise, (b) repeating steps (2) and (3) for a next sequence $D_{ijk}$; and (4) if an $N_i$ sequence is discarded in step (3), then repeating steps (2) and (3) for a next sequence $N_i$, and otherwise saving $N_i$ as an error-tolerant byte synchronization sequence.

16. The method of claim 15, further including the step of repeating steps (2)–(4) for a next selected bit pattern $P_o$, wherein $N_i$ is selected from the error-tolerant field bit synchronization sequences.

17. The method of claim 15, wherein each generated possible error data sequence comprises a possible error pattern $E_j$ of length b, located at position K of $N_i$.

18. A data storage unit having at least one track for storing data, each track comprising at least one sector, each sector including at least one synchronization field containing an error-tolerant synchronization field bit sequence, wherein the error tolerant synchronization field bit sequence allows a system for detecting the error-tolerant synchronization field bit sequence to correctly detect the error-tolerant synchronization field bit sequence encoded as a sequence of data bits on the data storage unit which are corrupted by an error burst having a length of as many as b bits by comparing the contents of the synchronization field to the sequence of data bits and by disregarding up to b bits of the error-tolerant synchronization field bit sequence, wherein b is an integer value greater than one, and wherein the error-tolerant synchronization field bit sequence is a hexadecimal 56, 58, B1, 1B8, 1BC, 1BE, 1E2, 2D3, 2D7, DC1, 3581, 3781, 61C8, 61 D4, 61D8, 61DC, 61E2, 61E8, 61EC, 61F2, 61F4, 61F8, 61FC, 61FE, 65C8, 65D4, 65D8, 65DC, 65E2, 65E8, 65EC, 65F2, 65F4, 65F8, 65FC, 65FE, 69C8, 69 D4, 69D8, 69DC, 69E2, 69E8, 69EC, 69F4, 69F8, 69FC, 69FE, 6DC8, 6DD8, 6DDC, 6DES, 6DEC, 6DF 8, 6DFC, 6DFE, AB01, AB05, AF01, B701, B70D, BB01, BB05, BF01, D701, DB01, or DF 01.

19. A computer system having selected error-tolerant field bit sequences, comprising:

(1) a data storage unit having at least one track for storing data, each track comprising at least one sector, each sector including at least one synchronization field containing an error-tolerant synchronization field bit sequence; and (2) means for determining the error-tolerant synchronization field bit sequence according to the following functions:

(a) selecting a bit pattern $P_o$, expected to precede the selected error-tolerant synchronization field bit sequence in said sequence of data bits on a data storage device, (b) generating a comparison result by comparing each of a generated test byte synchronization sequence $N_i$ of length L with a generated possible error data sequence $D_{ijk}$ that includes $P_o$, (c) testing the comparison result through synchronization detection logic, and if the comparison result indicates that more than b bits of the generated test byte synchronization sequence $N_i$ differ b from corresponding bits of generated possible error data sequence, where b is an integer value greater than one then:

(i) discarding the sequence $N_i$, otherwise, (ii) repeating (b) and (c) for a next sequence $D_{ijk}$, and (d) if an $N_i$ sequence is discarded in (c), then repeating (b) and (c) for a next sequence $N_i$, and otherwise saving $N_i$ as an error-tolerant byte synchronization sequence.

20. A data storage unit having at least one track for storing data, each track comprising at least one sector, each sector including:

(1) at least one phase-lock oscillator field; and (2) at least one synchronization field containing an error-tolerant synchronization field bit sequence, wherein the error-tolerant synchronization field bit sequence allows a system to correctly detect the error-tolerant synchronization field bit sequence encoded as a sequence of data bits on the data storage unit which are corrupted by an error burst having a length of as many as b bits by comparing the contents of the synchronization field to the sequence of data bits and by disregarding up to b bits of the error-tolerant synchronization field bit sequence, wherein b is an integer value greater than one, and wherein the error-tolerant synchronization field bit sequence is a hexadecimal 56, 58, B1, 1B8, 1BC, 1BE, 1E2, 2D3, 2D7, DC1, 3581, 3781, 61C8, 61 D4, 61D8, 61DC, 61E2, 61E8, 61EC, 61F2, 61F4, 61F8, 61FC, 61FE, 65C8, 65D4, 65D8, 65DC, 65E2, 65E8, 65EC, 65F2, 65F4, 65F8, 65FC, 65FE, 69C8, 69 D4, 69D8, 69DC, 69E2, 69E8, 69EC, 69F4, 69F8, 69FC, 69FE, 6DC8, 6DD8, 6DDC, 6DES, 6DEC, 6DF 8, 6DFC, 6DFE, AB01, AB05, AF01, B701, B70D, BB01, BB05, BF01, D701, DB01, or DF 01.

21. A computer system having selected error-tolerant field bit sequences, comprising:

(1) a data storage unit having at least one track for storing data, each track comprising at least one sector, each sector including:

(a) at least one phase-lock oscillator field, and (b) at least one synchronization field containing an error-tolerant synchronization field bit sequence; and (2) means for determining the error-tolerant field bit sequence according to the following functions:

(a) selecting a bit pattern $P_o$, expected to precede the selected error-tolerant synchronization field bit sequence in said sequence of data bits on a data storage device, (b) generating a comparison result by comparing each of a generated test byte synchronization sequence $N_i$ of length L with a generated possible error data sequence $D_{ijk}$ that includes $P_o$, (c) testing the comparison result through synchronization detection logic, and if the comparison result indicates that more than b bits of the generated test byte synchronization sequence $N_i$ differ b from corresponding bits of generated possible error data sequence, where b is an integer value greater than one, then:

(i) discarding the sequence $N_i$, otherwise;

(ii) repeating (b) and (c) for a next sequence $D_{ijk}$, and (d) if an $N_i$ sequence is discarded in (c), then repeating (b) and (c) for a next sequence $N_i$, and otherwise saving $N_i$ as an error-tolerant byte synchronization sequence.

22. A data storage unit having at least one track for storing data, each track comprising at least one sector, each sector including a header comprising:

(1) a first inter-sector gap field;

(2) a first phase-lock oscillator field;

(3) a first synchronization field;

(4) an identification field;

(5) a cyclic redundancy check field;

(6) a first padding field;

(7) a write splice field;

(8) a second phase-lock oscillator field;

(9) a second synchronization field;

(10) a data field;

(11) an error correction code field; and

(12) a second padding field, wherein the first and second synchronization field contains an error-tolerant synchronization field bit sequence, and wherein the error-tolerant synchronization field bit sequence allows a system to correctly detect the error-tolerant synchronization field bit sequence encoded as a sequence of data bits stored on the data storage unit which are corrupted by an error burst having a length of as many as b bits by disregarding up to b bits of the error-tolerant synchronization field bit sequence, and wherein b is an integer value greater than one.

23. The data storage unit of claim 22, wherein the error-tolerant synchronization field bit sequence is a hexadecimal 56, 58, B1, 1B8, 1BC, 1BE, 1E2, 2D3, 2D7, DC1, 3581, 3781, 61C8, 61D4, 61D8, 61DC, 61E2, 61E8, 61EC, 61 F2, 61F4, 61F8, 61FC, 61FE, 65C8, 65D4, 65D8, 65DC, 65E2, 65E8, 65EC, 65F2, 65F4, 65F8, 65FC, 65FE, 69C8, 69D4, 69D8, 69DC, 69E2, 69E8, 69EC, 69F4, 69F8, 69FC, 69FE, 6DC8, 6DD8, 6DDC, 6DE8, 6DEC, 6DF8, 6DFC, 6DFE, AB01, AB05, AF01, B701, B 70D, BB01, BB05, BF01, D701, DB01, or DF01.

24. A computer system having selected error-tolerant field bit sequences, comprising:

(1) a data storage unit having at least one track for storing data, each track comprising at least one sector, each sector including a header comprising:

(a) a first inter-sector gap field, (b) a first phase-lock oscillator field, (c) a first synchronization field, (d) an identification field, (e) a cyclic redundancy check field, (f) a first padding field, (g) a write splice field, (h) a second-phase lock oscillator field;

(i) second synchronization field, (j) a data field, (k) an error correction code field, and (l) a second padding field, wherein the first and second synchronization field contains an error-tolerant synchronization field bit sequence and (2) means for determining the error-tolerant field bit sequence according to the following functions:

(a) selecting a bit pattern $P_o$, expected to precede the selected error-tolerant synchronization field bit sequence in said sequence of data bits on a data storage device, (b) generating a comparison result by comparing each of a generated test byte synchronization sequence $N_i$ of length L with a generated possible error data sequence $D_{ijk}$, that includes $P_o$, (c) testing the comparison result through synchronization detection logic, and if the comparison result indicates that more than b bits of the generated test byte synchronization sequence $N_i$ differ b from corresponding bits of generated possible error data sequence, where b is an integer value greater than one, then;

(i) discarding the sequence $N_i$, otherwise, (ii) repeating (b) and (c) for a next sequence $D_{ijk}$, and (d) if an $N_i$ sequence is discarded in (c), then repeating (b) and (c) for a next sequence $N_i$, and otherwise saving $N_i$ as an error-tolerant byte synchronization sequence.

25. A system for detecting a selected error-tolerant synchronization field bit sequence encoded on a data storage unit, the system including:

(1) data register means, coupled to the data storage means and having a length of L bits, for serially accepting the sequence of data bits from the data storage means;

(2) synchronization pattern register means, having a length of L bits, for storing the selected error-tolerant synchronization field bit sequence;

(3) comparison means, coupled to the data register means and the synchronization pattern register means, for comparing the contents of the synchronization pattern register means with the contents of the data register means; and (4) synchronization detection means, coupled to the comparison means and responsive thereto, for locating the error-tolerant synchronization field bit sequence in the encoded sequence of data bits, wherein the synchronization detection means provides an indication of synchronization when an output of the comparison means indicates that no more than b consecutive bits of the synchronization pattern register means do not match corresponding bits of the data register means, but a remainder of the L bits of the synchronization pattern register means do match corresponding bits of the data register means, the remainder of the L bits including all of the L bits except the b consecutive bits, and wherein L is equal to 7 bits, b is equal to 1 bit, and the selected error-tolerant synchronization field bit sequence is a hexadecimal 56 or 58.

* * * * *